United States Patent
Ewe et al.

(10) Patent No.: US 9,003,312 B1
(45) Date of Patent: Apr. 7, 2015

(54) METHOD AND APPARATUS FOR UPDATING A WEB-BASED USER INTERFACE

(75) Inventors: Thomas Ewe, San Francisco, CA (US); Peter Guang Yun Cheng, Fremont, CA (US)

(73) Assignee: Synactive, Inc., Foster City, CA (US)

( * ) Notice: Subject to any disclaimer, the term of this patent is extended or adjusted under 35 U.S.C. 154(b) by 638 days.

(21) Appl. No.: 12/590,760

(22) Filed: Nov. 13, 2009

(51) Int. Cl.
*G06F 3/00* (2006.01)
*G06F 9/54* (2006.01)

(52) U.S. Cl.
CPC ................................ *G06F 9/543* (2013.01)

(58) Field of Classification Search
CPC ...................................................... G06F 9/543
USPC ......................................... 715/762, 760, 744
See application file for complete search history.

(56) References Cited

U.S. PATENT DOCUMENTS

| | | | |
|---|---|---|---|
| 6,058,375 A | 5/2000 | Park et al. | |
| 6,108,309 A | 8/2000 | Cohoe et al. | |
| 6,397,220 B1* | 5/2002 | Deisinger et al. | 707/607 |
| 6,760,745 B1 | 7/2004 | Tan et al. | |
| 6,822,663 B2* | 11/2004 | Wang et al. | 715/854 |
| 6,970,823 B1 | 11/2005 | Yago et al. | |
| 6,993,712 B2 | 1/2006 | Ramachandran et al. | |
| 7,093,195 B2 | 8/2006 | Lynch et al. | |
| 7,137,127 B2* | 11/2006 | Slotznick | 719/329 |
| 7,278,110 B1* | 10/2007 | Wugofski | 715/765 |
| 7,386,485 B1 | 6/2008 | Mussman et al. | |
| 7,493,591 B2* | 2/2009 | Charisius et al. | 717/100 |
| 7,577,601 B1 | 8/2009 | Rademacher et al. | |
| 7,752,299 B2 | 7/2010 | Bookman et al. | |
| 7,792,784 B2 | 9/2010 | Gupta | |
| 7,805,523 B2 | 9/2010 | Mitchell et al. | |
| 7,809,600 B1 | 10/2010 | Como et al. | |
| 7,899,763 B2 | 3/2011 | Machulsky et al. | |
| 7,970,943 B2 | 6/2011 | Lin et al. | |
| 8,010,605 B2 | 8/2011 | Chang | |
| 8,166,130 B2 | 4/2012 | Reinart | |
| 2002/0083154 A1* | 6/2002 | Auffray et al. | 709/218 |
| 2003/0014496 A1 | 1/2003 | Spencer et al. | |
| 2003/0231750 A1 | 12/2003 | Janveja et al. | |

(Continued)

FOREIGN PATENT DOCUMENTS

WO    WO 2008031625 A2 *    3/2008    ............. G06Q 10/00

OTHER PUBLICATIONS

GuiXT Designer Installation Guide, GuiXT® by Synactive, 2009, Synactive, Inc, Foster City, CA, 17 pages.

(Continued)

*Primary Examiner* — William Titcomb
(74) *Attorney, Agent, or Firm* — Pattric J. Rawlins; Procopio, Cory, Hargreaves & Savitch LLP

(57) ABSTRACT

A method and apparatus for updating a web-based user interface. The method comprises generating a user interface for a host application, accessing the user interface in a web browser, and modifying the user interface within the web browser during run-time of the application.

The apparatus comprises a user interface, a user interface updater, a web browser, and a host application. The web browser provides a way to display, access, and modify the user interface for communicating with the host application. The user interface updater generates the user interface and modifies the user interface in response to command information received from the web browser.

21 Claims, 4 Drawing Sheets

(56) References Cited

U.S. PATENT DOCUMENTS

| | | |
|---|---|---|
| 2006/0041618 A1 | 2/2006 | Chang |
| 2006/0212846 A1 | 9/2006 | O'Farrell et al. |
| 2006/0265662 A1* | 11/2006 | Gertzen .................. 715/760 |
| 2007/0094597 A1 | 4/2007 | Rostom |
| 2007/0112958 A1 | 5/2007 | Kim |
| 2007/0124670 A1* | 5/2007 | Finck et al. ............. 715/526 |
| 2007/0150820 A1* | 6/2007 | Salvo ..................... 715/760 |
| 2007/0220527 A1 | 9/2007 | Tolgu et al. |
| 2007/0234235 A1 | 10/2007 | Scott |
| 2007/0238488 A1 | 10/2007 | Scott |
| 2007/0238489 A1 | 10/2007 | Scott |
| 2007/0256003 A1 | 11/2007 | Wagoner |
| 2008/0040653 A1* | 2/2008 | Levine ................... 715/205 |
| 2009/0013267 A1* | 1/2009 | Cudich et al. ........... 715/762 |
| 2009/0013281 A1 | 1/2009 | Helfman et al. |
| 2009/0204583 A1* | 8/2009 | Hechler et al. ............. 707/3 |
| 2009/0228490 A1 | 9/2009 | Faenger |
| 2009/0318126 A1 | 12/2009 | Schimitzek |
| 2010/0005053 A1 | 1/2010 | Estes |
| 2010/0100823 A1* | 4/2010 | Ewe et al. ............... 715/733 |
| 2011/0111742 A1 | 5/2011 | Neil et al. |
| 2011/0307630 A1 | 12/2011 | Lange et al. |
| 2012/0110209 A1 | 5/2012 | Bonefas et al. |
| 2013/0060845 A1 | 3/2013 | Chalana et al. |
| 2013/0097095 A1 | 4/2013 | Rumig et al. |
| 2013/0103391 A1 | 4/2013 | Millmore et al. |

OTHER PUBLICATIONS

GuiXT Designer Configuration Guide, GuiXT® by Synactive, 2009, Synactive, Inc, Foster City, CA, 13 pages.

International Search Report and Written Opinion mailed on May 3, 2010 for PCT/US2009/061469.

\* cited by examiner

METHOD AND APPARATUS FOR UPDATING A WEB-BASED USER INTERFACE

CROSS-REFERENCE TO RELATED APPLICATIONS

This application contains subject matter related to commonly assigned U.S. patent application Ser. No. 12/288,460 filed Oct. 21, 2008, which is hereby incorporated by reference in its entirety.

BACKGROUND OF THE INVENTION

1. Field of the Invention

Embodiments of the present invention generally relate to a network based computer interaction and, more particularly, to a method and apparatus for updating a user interface of a client device.

2. Description of the Related Art

Computer systems exist that enable a user to remotely access computer information, e.g., a database. In some instances a user will use a client device, e.g., cell phone, personal digital assistant (PDA), lap top computer, application specific device, and the like, to connect via a network to a server hosting the information. Such devices have a predefined interface for accessing the computer information from the server. The interface may be created by a program or agent executing on the device; however, such programs or agents require substantial processing resources and memory availability which make them unsuitable for many devices. The interface, produced by such programs or agents, is static—the user enters data and/or queries in predefined fields.

More recently, to accommodate a wide range of devices, browsers have been used to launch web pages that form the interface to the computer information (i.e., web-based user interface). Although web-based user interfaces generally utilize less computer resources than application (program) based interfaces, the interface remains static, i.e., once created, the interface remains the same for each user. The static nature of the interface may impact worker productivity in that the interface cannot be easily optimized to their work habits.

While applications exist that allow run-time modification of such interfaces, they typically require a large install, significant processing power, and a significant amount of data to be transmitted to and from the application server. These requirements make the applications unsuitable for uses on many types of devices, such as mobile devices. These devices are often limited to static interfaces for these reasons.

It would be advantageous if it were possible to modify the user interface of a web-based application at run time. Therefore, there is a need in the art for a dynamic web-based user interface updater.

SUMMARY OF THE INVENTION

An embodiment of the present invention comprises a method and apparatus for updating a web-based user interface. The method comprises generating a user interface for a host application, accessing the user interface in a web browser, and modifying the user interface within the web browser during run-time of the application.

The apparatus comprises a user interface, a user interface updater, a web browser, and a host application. The web browser provides a way to display, access, and modify the user interface for communicating with the host application. The user interface updater generates the user interface and modifies the user interface in response to command information received from the web browser.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
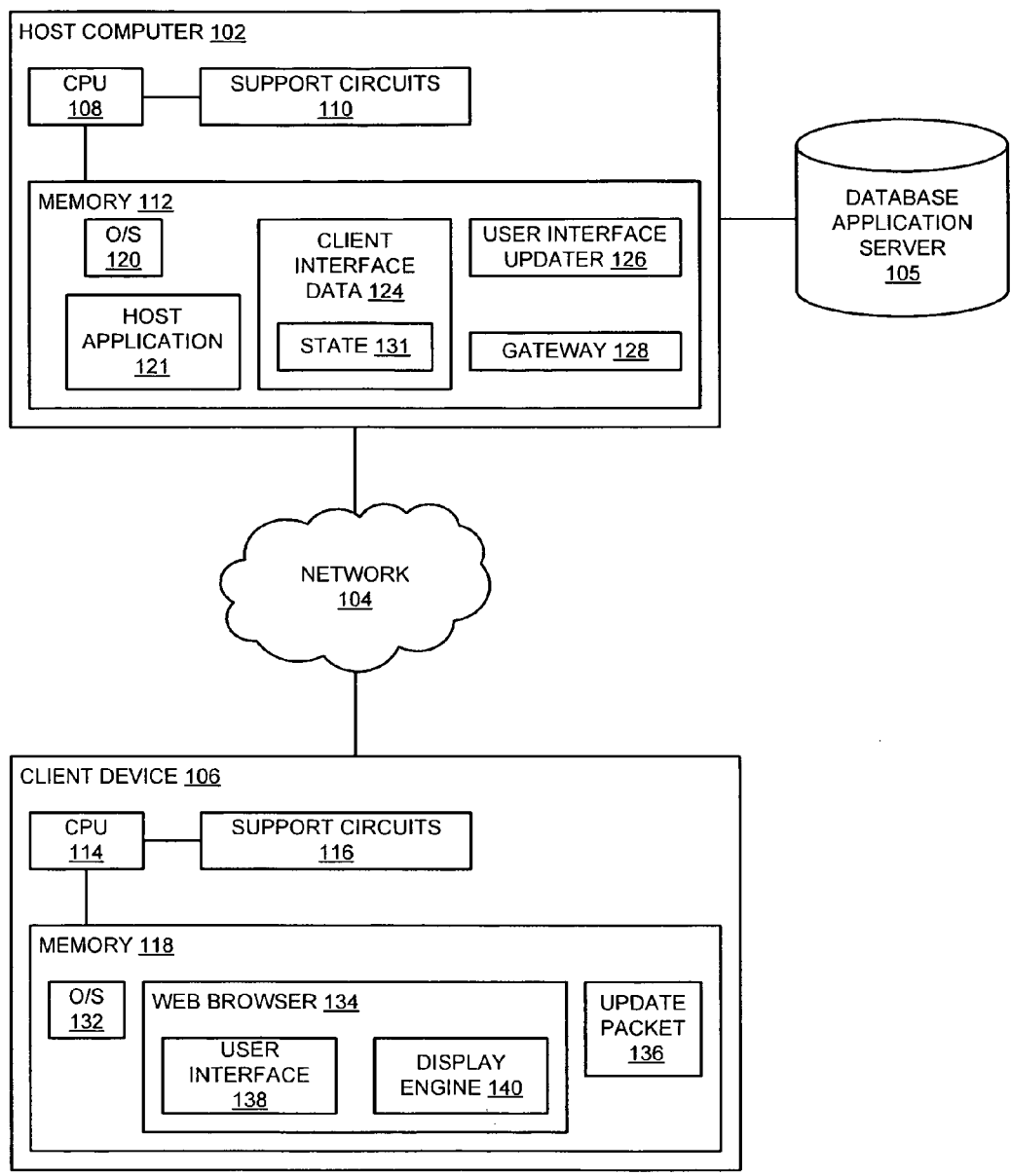
FIG. 1 is a depiction of a block diagram depicting a computer network in which an embodiment of the present invention is used.

FIG. 1 is a block diagram depicting a system 100 for updating a user interface 138 according to an embodiment of the present invention. In one embodiment, the system comprises a host computer 102, a client device 106, and a network 104 coupling the client device 106 to the host computer 102. The host computer 102 receives command information from the client device 106, and updates client interface data 124 in accordance with the command information. Although in this exemplary embodiment the client device 106 and the host computer 102 are separate entities coupled by a network 104, a person of ordinary skill in the art would recognize that both could be implemented as a single computing device. In one embodiment, the host computer 102 may be coupled to a database application server 105. The host computer 102 may provide a gateway interface 121 to the database application server 105 for the client device(s) 104. This gateway interface 121 allows the client device 106 to interact with the database application server 105 via a scripted application such as can be executed in a web browser environment. In one embodiment, the gateway interface 121 facilitates communication between the client device 106 and the database application server 105 by providing additional data, function calls, wrapper functions, and the like not present in the initial communication from the client device. In one embodiment, the gateway interface 121 parses communications from the database application server 105 into a format readable by the client device 106. In one embodiment, the database application server 105 may implement an Enterprise Resource Planning software package. The present invention advantageously allows a client device 106 to interface with such a software package without the need to load specialized design software often associated with the implementation of such packages.

In one embodiment the host computer 102 is a computing device such as those generally known in the art. The host computer 102 includes a central processing unit (CPU) 108, support circuits 110, and memory 112. The CPU 108 may comprise one or more commercially available microprocessors or microcontrollers that facilitate data processing and storage. The various support circuits 110 are utilized to facilitate the operation of the CPU 108 and include such circuits as clock circuits, power supplies, cache, input/output circuits, and the like. The memory 112 may comprise random access memory, read only memory, removable storage, optical disk storage, disk drive storage, and combinations thereof. The memory 112 stores a server operating system 120, a host application 128, client interface data 124, a user interface updater 126, an interface information packet 130, and a gateway interface 121. In operation, the CPU 108 executes the operating system 120 to control the general utilization and functionality of the host computer 102.

The CPU 108 also executes the host application 128. The host application 128 listens for incoming command information from the client device 106. When the command information is received, the host application 128 executes the user interface updater 126. The user interface updater 126 parses the command information and updates a client interface state 131 in the client interface data 124 accordingly. The client interface data 124 may be stored in volatile memory, non-volatile memory, or a mixture of both. In one embodiment, information describing the base, unmodified client interface may be stored in volatile memory, with individual client interface states 131 loaded on-demand from non-volatile memory.

In one embodiment, the client interface state 131 may be represented as a script. The script may correspond to and represent the changes that must be made to a base interface also stored within the client interface data. The base interface is sent to the client device 106 and represents a "clean" user interface as sent prior to any changes. As changes are made, the script associated with that particular client device 106 is modified reflecting the updates. By saving only the differences from a base interface, the memory footprint of the client interface data 124 is minimized. In one embodiment, the gateway interface 121 may be executed by the CPU 108 to provide access to a database application server 105.

The client device 106 is a computing device such as those generally known in the art. The client device 106 may comprise any device capable of executing a web browser, for example, a hand-held bar code reader, a cellular phone, a personal digital assistant, or a personal computer. The client device 106 includes a CPU 114, support circuits 116, and memory 118. The CPU 114 may comprise one or more commercially available microprocessors or microcontrollers that facilitate data processing and storage. The various supporting circuits 116 are utilized to facilitate the operation of the CPU 114 and include such circuits as clock circuits, power supplies, cache, input/output circuits, and the like. The memory 118 may comprise random access memory, read only memory, removable storage, optical disk storage, disk drive storage, and combinations thereof. The memory 118 stores an operating system 132, a web browser 134, and an update packet 136. In operation, the CPU 114 executes the operating system 132 to control the general utilization and functionality of the client device 106.

The CPU 114 also executes the web browser 124. The web browser 124 displays the user interface 138, and executes a display engine 140 to interpret and execute commands provided in a scripted language. In one embodiment, these commands may be provided in the JAVASCRIPT language. The web browser 124 provides an interface for and is coupled with the database application server 105 by via the host computer 102. The user interface 138 receives input and can be modified at run-time. In this manner, the invention advantageously allows the user to seamlessly transition from a data entry mode to an editor mode during run-time. For example, the user interface 138 may provide list boxes, radio buttons, check boxes, and other fields for data input. These fields may be moved, added, deleted, renamed, or otherwise modified without the need to execute a separate editor program. When a modification occurs, an update packet 136 containing command information is generated and sent to the host computer 102 by way of scripted commands running on the display engine 140 contained within the web browser 124.

Figure 2:
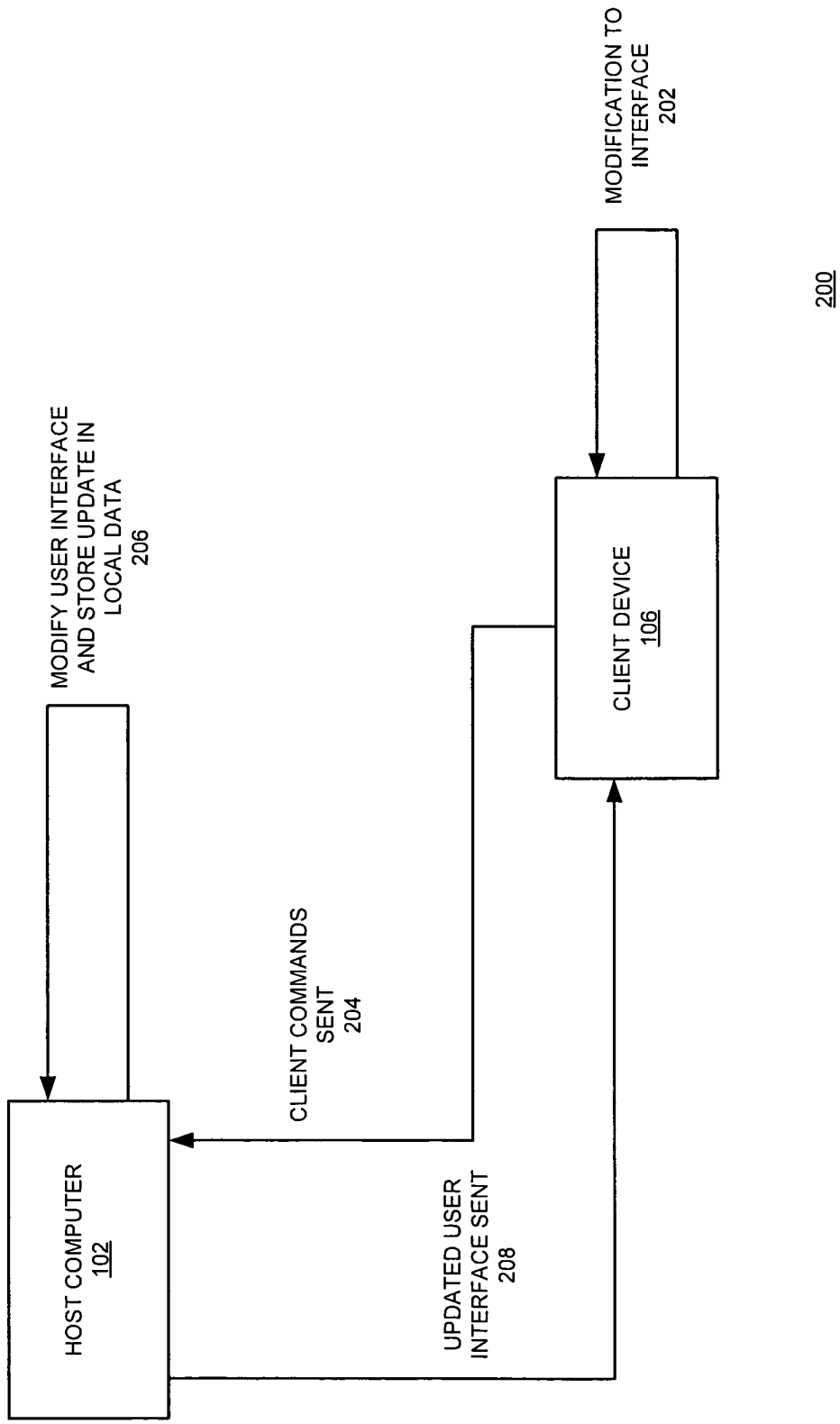
FIG. 2 is a functional diagram depicting the communications between a host computer and a client computer in which an embodiment of the present invention is used.

FIG. 2 is a functional diagram of a model 200 for updating a user interface according to an embodiment of the present invention. Prior to the execution of this method, a user interface 138 may be generated on the client device via the method disclosed in commonly assigned U.S. patent application Ser. No. 12/288,460, filed Oct. 21, 2008, which is herein incorporated by reference. At step 202, the client is placed into an "Edit Mode" and a modification, such as a drag and drop movement, addition, deletion, or the like, is made to the user interface 138 displayed in the web browser. The "Edit Mode" may be enabled by a user or may be enabled in response to an external communication received by the web browser 134. In some embodiments, the user may enable edit mode by clicking a button or selecting the option from a drop-down box. This mode allows the user interface 138 to accept modifications. In one embodiment, when the user interface 138 is placed into edit mode, the display engine 140 looks up and saves into an array all document nodes and elements which match a predefined set of rules. For example, the display engine 140 may save all elements which have a particular Cascading Style Sheet class type, such as all elements with a <SPAN> tag whose class name contains "movable." The display engine 140 then modifies each element matching the predefined rule set to make that element modifiable.

Exemplary modifications include drag-and-drop and resizing operations. In one embodiment, a drag-and-drop operation may be implemented by the following process:

1. The display engine 140 captures all mouse movements within the browser window (via document.onmousemove event)
2. The display engine 140 captures the mouse click events (object.onmouseup and object.onmousedown events) of all click-and-draggable Document Object Model (DOM) elements. The DOM is a cross-platform and language independent convention for interacting with objects in HTML, XML, DHTML documents, and the like.
3. When the display engine 140 detects an onmousedown event on an object, the display engine 140 sets the document.onmousemove event to do the following:
    Get the coordinates of the mouse cursor (by getting the event object's offsetLeft and offsetTop) and assign that coordinate to the currently dragged object.
    The display engine 140 simulates the "dragging" of the object by continuously setting the XY coordinates of the object (by setting object.style.left and object.style.top CSS properties) to match the cursor's XY coordinates within the browser window until document.onmouseup event is fired, at that point the display engine 140 stops assigning new coordinates to the dragged object, thereby "dropping" it where it was last left off on the screen.

In one embodiment, the display engine 140 adds a small but visible hook object (e.g. span tag) to the lower right corner of that object to make an object resizable (such as a div node element). The display engine 140 then makes that hook element drag-and-droppable (as above). As that hook element is dragged, the display engine 140 dynamically calculates and sets the new width and height of the resizable object. When the hook element is dropped, the display engine 140 stops calculating and setting new width and height, leaving the last set width and height as the object's new dimension.

At step 204, the display engine 140 parses the array containing the modifications to the user interface 138. In one embodiment, the display engine 140 creates the update packet 136 by collecting the XY position coordinates, width and height, default text, default foreground and background colors, and the like. This data is saved into a JAVASCRIPT Object Notation (JSON) object to be transmitted to the host computer 102. The client 106 sends the update packet 136 to the host computer 102. The update packet 136 comprises data describing the modification, as described below with respect to FIG. 5.

At step 206, the host computer 102 receives the update packet, and modifies the client interface data 124 in accordance with the update packet 136. The host computer 102 matches the elements in the update packet 136 to element identifiers associated with each element of the user interface 138. The elements of the client interface data 124 associated with the element identifiers of the update packet 136 are modified in response to the data received in the update packet 136. In one embodiment, the client device 106 may be associated with a specific interface state 131 located within the client interface data 124, and therefore only that object of the client interface data 124 will be modified.

At step 208, the host computer 102 may send information to the client device 106 reflecting the changes contained in the update packet 136. In this manner, an embodiment of the invention may provide "What You See Is What You Get" (WYSIWYG) modification functionality to the web browser environment, as the host computer 102 generates an updated user interface 138 for the client device 106 as modifications are made and sent on the client side via update packets 136.

Figure 3:
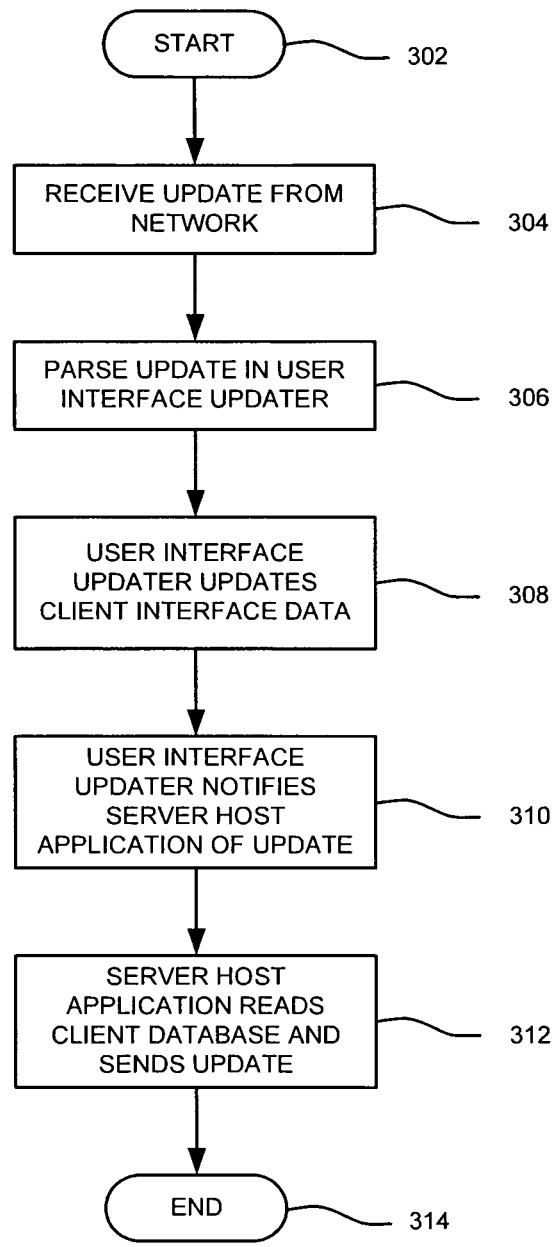
FIG. 3 is a flow diagram of a method for updating client user interface information on a host computer.

FIG. 3 depicts an embodiment of a method 300 for updating client interface data 124. The method begins at step 302, where an update packet 136 has been generated and sent over the network 104. At step 304, the host computer 102 receives the update packet 136. At step 306, the update packet 136 is routed to and parsed at the user interface updater 126. The user interface updater 126 may be a separate software module or functionality for updating the user interface may be included in the host application 128. The user interface updater 126 modifies the client interface data 124 in accordance with the command information contained within the update packet 136. In one embodiment, the update packet 136 contains a command to move an object by a certain vector. Other possible modifications include changes to interface colors, background, text strings, data entry field locations, element sizes, and the like. The user interface updater 126 modifies an entry within the client interface data 124 to reflect a user interface 138 with the object in the new position. The next time an interface information packet is sent to the client device, the data contained within the interface information packet would reflect this change.

In one embodiment, the client interface data 124 modified may correspond to an identifier associated with the state 131 of a specific client device 106. In this manner, an update for a single user interface 138 may be performed, even if the host computer 102 provides interfaces for multiple client devices 106. At step 310, in one embodiment, the user interface updater 136 may notify the host application 128 that the user interface 138 for the client device 106 has been updated. At step 312, the host application 128 may then send an update to the client device 106 reflecting the change to the user interface 138 recorded in the client interface data 124. In this manner, it is possible to update the user interface 138 immediately after a command has been entered, without requiring any design and development software on the client device other than a web browser 134. The method ends at step 314 after the update has been sent.

Figure 4:
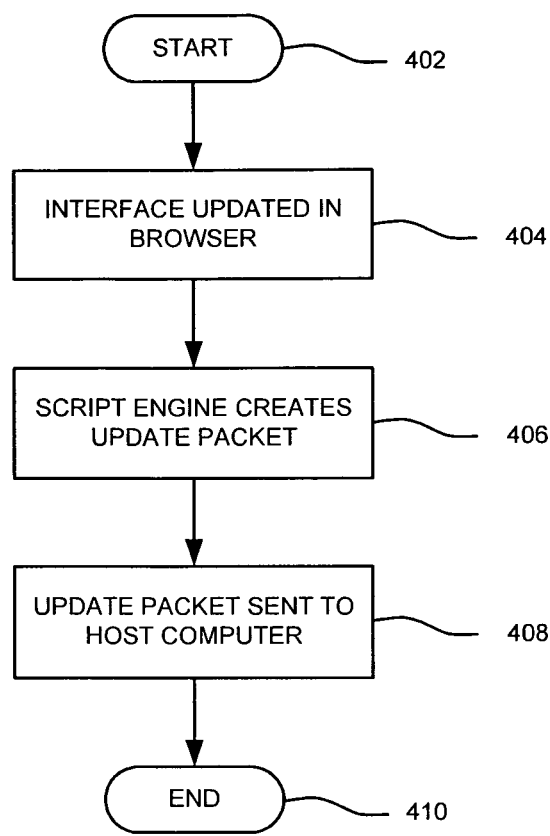
FIG. 4 is a flow diagram of a method for creating command information to be sent to a host computer.

FIG. 4 depicts an embodiment of a method 400 of generating an update packet 136. The method begins at step 402 where an interface that is modifiable in accordance with an embodiment of the invention is present on the web browser 134. At step 404, a modification is made to an element of the user interface 138. At step 406, the display engine 140 generates an update packet 136 describing the modification made to the user interface 138. At step 408, the update packet 136 is sent to the host computer 102.

Figure 5:
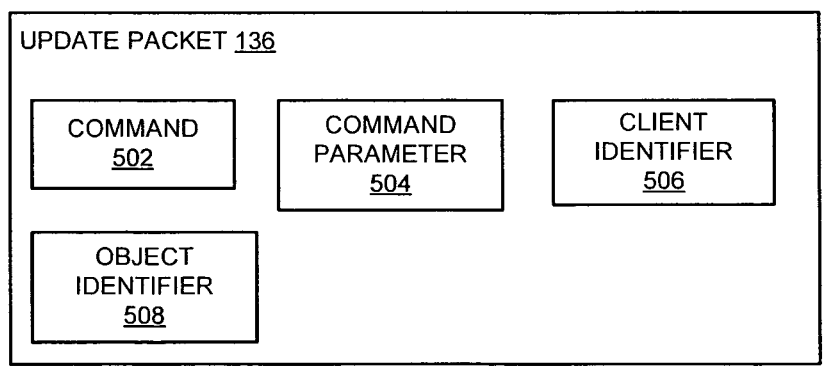
FIG. 5 is a block diagram of an update packet containing command information.

FIG. 5 depicts a block diagram of an embodiment of an update packet 136. This update packet reflects the command information sent to the host computer 102 when a modification is made to the user interface 138. In one embodiment, the update packet 136 comprises one or more of an object identifier 508, one or more of a command 502, one or more of a command parameter, 504, and a client identifier 506. The object identifier 508 is data representing which command element of the user interface 138 the modification pertains to. For example, it may reference a list box, a radio button, a check box, a text field, and the like. The command 502 describes the action that is to be taken upon the structure referenced by the object identifier 508. For example, the command 502 may indicate the structure is to be added, moved, renamed, deleted, or otherwise modified. The command may also represent an interface configuration change, such as foreground and background colors and other page display settings that are not tied to specific control structures (such as list boxes, labels, and radio buttons). The command parameter 504 provides data specific to the command 502 to be executed. For example, if the command 502 is a "move," then the command parameter 504 may indicate the direction and distance for the structure represented by the object identifier 508 to be moved; if the command 502 is a "modify," then the command parameter 504 may indicate a string to replace inside of a designated text field; if the command modifies the screen background color, then the command parameter 504 may contain data representing the color the background is to be changed to. The client identifier 506 is a unique value associated with the specific client device to be modified. This identifier allows the host computer 102 to modify the user interface 138 for a specific client device 106, rather than for all client devices 106.

While the foregoing is directed to embodiments of the present invention, other and further embodiments of the invention may be devised without departing from the basic scope thereof, and the scope thereof is determined by the claims that follow.

The invention claimed is:

1. A method of updating a web-based user interface, the method comprising using at least one central processing unit of a host to, for each of one or more client devices:

send a base user interface for a host application to the client device via at least one network, wherein the base user interface is configured to be displayed by a web browser on the client device;

wherein an application in the web browser toggles the user interface into an editor mode during run-time, the editor mode providing modifiable fields to the base user interface based on input to the client device;

in response to a toggling the user interface out of the editor mode, receive one or more updates from the client device via the at least one network, wherein each of the one or more updates comprises a client identifier and one or more user modifications to the base user interface which were made within the application of the web browser on the client device during the editor mode, the one or more user modifications directed to one or more command elements of the base user interface;

generate or update client interface data associated with the client identifier based on the one or more user modifications of the base user interface, wherein the client interface data comprises a script representing the one or more user modifications to the base user interface;

generate a modified user interface for the host application based on the base user interface and the script; and send the modified user interface to the client device via the at least one network;

wherein the modified user interface is configured to interact with the host application to facilitate an interaction between the client device and an enterprise resource provisioning software package of a database application server.

2. The method of claim 1, wherein the one or more client devices comprise a plurality of client devices, and wherein the method further comprises storing separate client interface data for each of the plurality of client devices.

3. The method of claim 1, further comprising, for each of the one or more client devices, providing a display engine to the client device, wherein the display engine is configured to obtain one or more user modifications of a user interface within the web browser from a user of the client device.

4. The method of claim 3, wherein the display engine is further configured to switch the user interface to an edit mode in which the user interface accepts one or more user modifications from a user of the client device.

5. The method of claim 4, wherein the display engine generates an update comprising the client identifier and the obtained one or more user modifications, and sends the update to the host.

6. The method of claim 1, wherein each of the one or more user modifications comprise an object identifier which identifies an element of the user interface, a command which identifies an action to be taken upon the identified element, and a command parameter comprising one or more parameters for the action.

7. The method of claim 6, wherein the action comprises at least one of adding an element to the user interface, moving an element of the user interface, deleting an element of the user interface, or modifying an attribute of an element of the user interface.

8. The method of claim 7, wherein modifying an attribute of an element of the user interface comprises at least one of renaming the element, setting a default value of the element, modifying a text field of the element, or setting a color of the element.

9. An apparatus for updating a web-based user interface, the apparatus comprising:
 at least one processor; and
 one or more software modules that, when executed by the at least one processor, for each of one or more client devices,
  sends a base user interface for a host application to the client device via at least one network, wherein the base user interface is configured to be displayed by a web browser on the client device,
  wherein an application in the web browser toggles the user interface into an editor mode during run-time, the editor mode providing modifiable fields to the base user interface based on input to the client device;
  in response to a toggling the user interface out of the editor mode, receive one or more updates from the client device via the at least one network, wherein each of the one or more updates comprises a client identifier and one or more user modifications to the base user interface which were made within the application of the web browser on the client device during the editor mode, the one or more user modifications directed to one or more command elements of the base user interface,
  generate or update client interface data associated with the client identifier based on the one or more user modifications of the base user interface, wherein the client interface data comprises a script representing the one or more user modifications to the base user interface,
  generate a modified user interface for the host application based on the base user interface and the script, and
  send the modified user interface to the client device via the at least one network;
  wherein the modified user interface is configured to interact with the host application to facilitate an interaction between the client device and an enterprise resource provisioning software package of a database application server.

10. The apparatus of claim 9, wherein the one or more updates comprise a JavaScript Object Notation object.

11. The apparatus of claim 9, wherein the client interface data comprises one or more vectors, wherein each vector represents a direction and distance to move an element of the base user interface.

12. The apparatus of claim 9, further comprising, for each of the one or more client devices, providing a display engine to the client device, wherein the display engine is configured to obtain one or more user modifications of a user interface within the web browser from a user of the client device.

13. The apparatus of claim 12, wherein the display engine comprises JavaScript code.

14. The apparatus of claim 12, wherein the display engine generates an update comprising the client identifier and the obtained one or more user modifications, and sends the update to at least one of the one or more software modules, wherein each of the one or more user modifications comprises an object identifier which identifies an element of the user interface, a command which identifies an action to be taken upon the identified element, and a command parameter comprising one or more parameters for the action, and wherein the action comprises at least one of adding an element to the user interface, moving an element of the user interface, deleting an element of the user interface, or modifying an attribute of an element of the user interface.

15. The apparatus of claim 9, wherein the one or more client devices comprise a plurality of client devices, and wherein the one or more software modules further store separate client interface data for each of the plurality of client devices.

16. The apparatus of claim 15, wherein the client interface data comprise one or more delta scripts representing changes made to the base user interface.

17. The apparatus of claim 12, wherein the display engine is configured to switch the user interface to an edit mode in which the user interface accepts one or more user modifications from a user of the client device.

18. The apparatus of claim 17, wherein the display engine is further configured to, when in the edit mode:

determine one or more elements of the user interface that match a predefined rule;

modify each of the one or more elements to make the element modifiable;

collect one or more modifications to one or more of the one or more elements; and send the collected one or more modifications to the one or more software modules.

19. The apparatus of claim 18, wherein collecting one or more modifications to one or more of the one or more elements comprises:

detecting a mouse-down event for a first element of the user interface;

detecting a mouse-up event for the first element; and in response to the detection of the mouse-down event and until the detection of the mouse-up event, determining coordinates of a mouse cursor and setting a position of the first element to the coordinates of the mouse cursor.

20. The apparatus of claim 18, wherein collecting one or more modifications to one or more of the one or more elements comprises dynamically calculating a width and height of an element as it is being resized by the user.

21. The apparatus of claim 18, wherein an element matches the predefined rule if a class name of the element contains a predefined tag.

\* \* \* \* \*